US010689119B2

(12) United States Patent
Pinger et al.

(10) Patent No.: US 10,689,119 B2
(45) Date of Patent: Jun. 23, 2020

(54) SEAT SYSTEM

(71) Applicant: HAECO Americas, Inc., Greensboro, NC (US)

(72) Inventors: Chad S. Pinger, Greensboro, NC (US); James S. Wolter, Greensboro, NC (US)

(73) Assignee: HAECO Americas, LLC, Greensboro, NC (US)

( * ) Notice: Subject to any disclaimer, the term of this patent is extended or adjusted under 35 U.S.C. 154(b) by 0 days.

(21) Appl. No.: 16/099,005

(22) PCT Filed: May 4, 2017

(86) PCT No.: PCT/US2017/031099
§ 371 (c)(1),
(2) Date: Nov. 5, 2018

(87) PCT Pub. No.: WO2017/192875
PCT Pub. Date: Nov. 9, 2017

(65) Prior Publication Data
US 2019/0152607 A1 May 23, 2019

Related U.S. Application Data

(60) Provisional application No. 62/332,248, filed on May 5, 2016.

(51) Int. Cl.
*B60N 2/10* (2006.01)
*B60N 2/12* (2006.01)
(Continued)

(52) U.S. Cl.
CPC ............ *B64D 11/064* (2014.12); *B60N 2/028* (2013.01); *B60N 2/2209* (2013.01);
(Continued)

(58) Field of Classification Search
CPC ............ B64D 11/064; B64D 11/00151; B64D 11/00155; B64D 11/0638; B64D 11/0642;
(Continued)

(56) References Cited

U.S. PATENT DOCUMENTS 3,773,381 A    11/1973  Brennan ........................ 297/191
5,133,587 A *   7/1992  Hadden, Jr. .......... B60N 2/4214
                                                      297/318 X
(Continued)

FOREIGN PATENT DOCUMENTS

WO    WO 2017/192875    11/2017    ............... B60N 2/10

*Primary Examiner* — Rodney B White
(74) *Attorney, Agent, or Firm* — MacCord Mason PLLC

(57) ABSTRACT

A seat system for a passenger aircraft. The seat system includes a passenger seat frame having at least one pair of generally parallel spar tubes laterally positioned across the passenger seat frame and an articulating seat pan assembly. In one embodiment, the articulation seat pan assembly includes at least two pairs of opposed crescent-shaped seat pan roller assemblies attached to the spar tubes and a seat pan adapted to be mounted onto the pairs of opposed seat pan roller assemblies whereby the seat pan articulates along the seat pan rollers from back to front of the passenger seat frame. The seat system may further include a seat back tray table attached to the back of the passenger seat.

56 Claims, 14 Drawing Sheets

(51) Int. Cl.
*B60N 2/20* (2006.01)
*B64D 11/06* (2006.01)
*B60N 2/22* (2006.01)
*B60N 2/02* (2006.01)
*B64D 11/00* (2006.01)

(52) U.S. Cl.
CPC .... *B64D 11/00151* (2014.12); *B64D 11/0638* (2014.12); *B64D 11/0642* (2014.12); *B64D 11/0647* (2014.12); *B64D 11/0648* (2014.12); *B64D 11/00155* (2014.12)

(58) Field of Classification Search
CPC .......... B64D 11/0647; B64D 11/0648; B60N 2/028; B60N 2/2209
USPC ................ 297/163, 317, 318, 340, 341, 342
See application file for complete search history.

(56) References Cited

U.S. PATENT DOCUMENTS

| | | | | |
|---|---|---|---|---|
| 6,688,691 B2* | 2/2004 | Marechal | ............ | A47C 1/0352 297/317 |
| 6,742,840 B2* | 6/2004 | Bentley | .................... | B60N 2/22 297/317 X |
| 7,108,326 B2* | 9/2006 | Schurg | ................. | B60N 2/0292 297/317 |
| 7,210,740 B2* | 5/2007 | Chintapudi | ........ | B60N 2/01508 297/340 X |
| 7,806,476 B2* | 10/2010 | Forgatsch | ................ | B60N 2/62 297/284.11 |
| 8,272,694 B2 | 9/2012 | Hawkins et al. | ............. | 297/341 |
| 8,439,435 B2* | 5/2013 | Gaither | .................. | B60N 2/242 297/317 X |
| 8,616,631 B2* | 12/2013 | Westerink | ................ | B60N 2/24 297/188.08 |
| 8,727,440 B1 | 5/2014 | Giasson et al. | ............ | 297/344.1 |
| 8,733,840 B2* | 5/2014 | Westerink | ............ | B60N 2/1625 297/317 X |
| 9,326,608 B1 | 5/2016 | Hoy et al. | ......................... | 7/506 |
| 9,771,155 B2* | 9/2017 | Zheng | ................ | B64D 11/0619 |
| 9,994,321 B2* | 6/2018 | Murnan | ................. | B64D 11/06 |
| 10,167,083 B2* | 1/2019 | Henshaw | ............ | B64D 11/064 |
| 10,207,808 B2* | 2/2019 | Zheng | ............ | B64D 11/064 |
| 2004/0007910 A1 | 1/2004 | Skelly | ......................... | 297/406 |
| 2010/0253129 A1* | 10/2010 | Dowty | ................. | B64D 11/064 297/85 M |
| 2010/0308167 A1 | 12/2010 | Hawkins et al. | ............. | 244/122 |
| 2011/0187163 A1* | 8/2011 | Westerink | .............. | B60N 3/004 297/163 |
| 2011/0316311 A1* | 12/2011 | Westerink | .............. | B60N 3/004 297/163 |
| 2012/0139302 A1 | 6/2012 | Estevenin et al. | ............ | 297/162 |
| 2012/0139303 A1* | 6/2012 | Westerink | .......... | B64D 11/0015 297/163 |
| 2014/0077533 A1* | 3/2014 | Shih | ...................... | B60N 3/004 297/163 |
| 2015/0108798 A1* | 4/2015 | Boyer, Jr. | .......... | B64D 11/0638 297/163 |
| 2015/0108804 A1 | 4/2015 | Meister et al. | ........ | B64D 11/06 |
| 2015/0284087 A1 | 10/2015 | Henshaw | .......................... | 11/64 |
| 2016/0001886 A1 | 1/2016 | Fullerton | ........................ | 11/647 |
| 2016/0152169 A1* | 6/2016 | Zheng | ................ | B64D 11/0636 297/163 |

\* cited by examiner

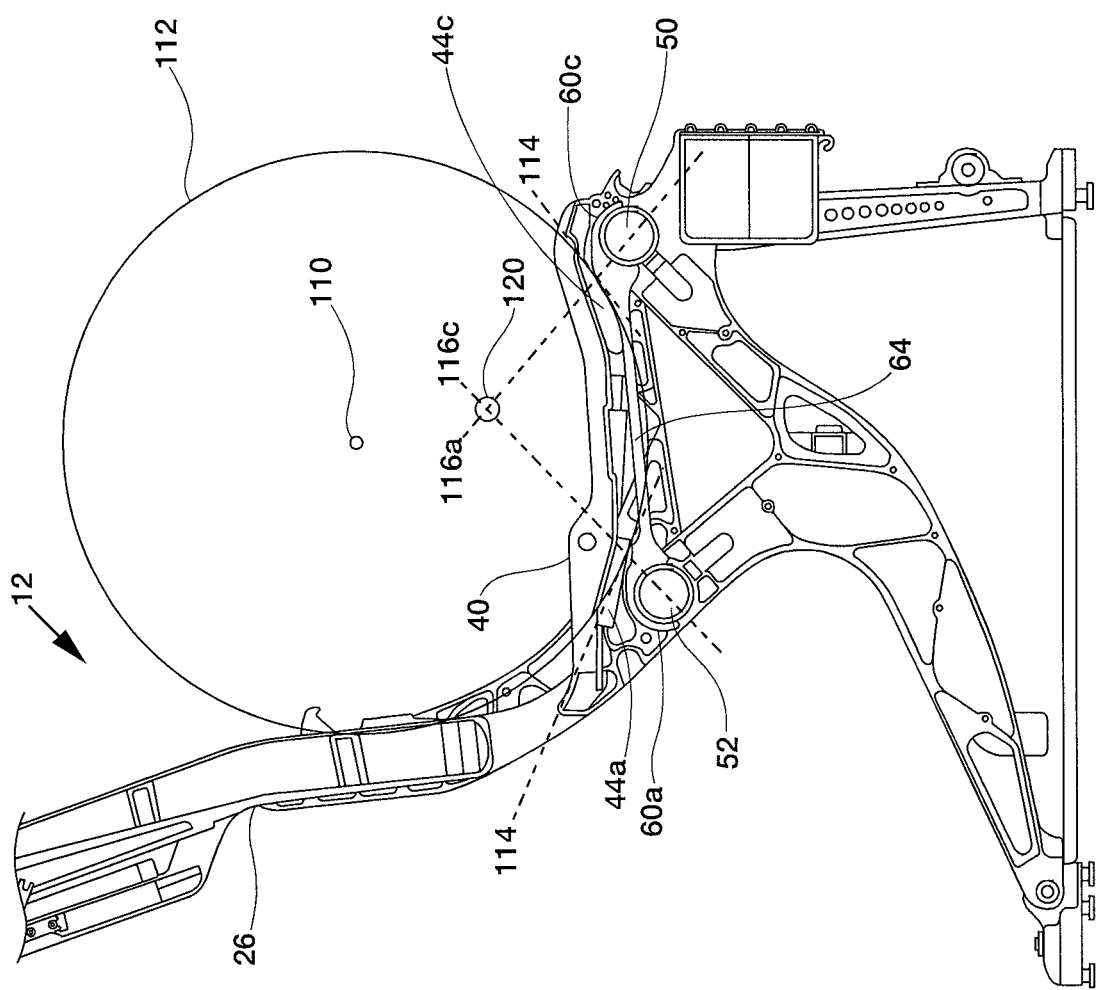

SEAT SYSTEM

CROSS-REFERENCE TO RELATED APPLICATIONS

This application claims the benefit of U.S. Provisional Patent Application No. 62/332,248 filed May 5, 2016, and PCT/US2017/31099 filed May 4, 2017, entitled SEAT SYSTEM.

BACKGROUND OF THE INVENTIONS

(1) Field

The present inventions relates generally to seat systems for passenger vehicles and, more particularly, to a seat system for a passenger aircraft.

(2) Related Art

Articulating seats provide improved comfort to passengers onboard an aircraft by sliding the seat bottom forward proportional to the distance that the backrest reclines. By moving the seat pan as the seat reclines, the passenger is given the impression that the backrest is reclined at a distance further than it actually is. Another benefit of articulating seat pans is the efficient management of seat pitch, since the backrest does not have to recline as far back to provide the same level of comfort to a passenger.

However, some articulating seat pans simply slide forward as the backrest reclines, thereby decreasing comfort and giving passengers the impression that they are simply being pushed out of the seat itself. Another issue with articulating seat pans is that some seat pans do not provide smooth action as it articulates across the passenger seat frame.

Yet another drawback to articulating seat pans currently available is the increased number of parts typically required for assembly. The higher number of parts to be installed increases the complexity and the time needed for installation. Moreover, additional tools may be necessary in order to install all available parts.

Thus, there remains a need for a seat system having an articulating seat pan, while at the same time, reduces the parts and tools needed for installation and maintenance.

SUMMARY OF THE INVENTIONS

The present inventions are directed to a seat system for a passenger aircraft. The seat system includes a passenger seat frame having at least one pair of generally parallel spar tubes laterally positioned across the passenger seat frame and an articulating seat pan assembly. In one embodiment, the articulation seat pan assembly includes at least two pairs of opposed crescent-shaped seat pan roller assemblies attached to the spar tubes wherein each of the seat pan roller assemblies include a seat pan roller attached to its upper surface; a seat pan adapted to be mounted onto the pairs of opposed seat pan roller assemblies whereby the seat pan articulates along the seat pan rollers from back to front of the passenger seat frame; and a cross brace adapted to prevent the rotation of each pair of opposed seat pan roller assemblies about the radius of each of the spar tubes. The seat system may further include a seat back tray table attached to the back of the passenger seat.

In one embodiment, a drive link is attached to the seat pan and a hinge is attached to a backrest and the drive link. The drive link may be adapted to articulate the seat pan to a distance proportional to the distance that the backrest reclines. In one embodiment, the hinge is a gas spring. The gas spring may be adapted to compress as the backrest reclines.

In one embodiment, the pair of opposed seat pan roller assemblies are mounted without tools. The pair of opposed seat pan roller assemblies may be attached by a clamp. The clamp may be a worm drive clamp.

The cross brace may be injection molded as a single piece with the pair of seat pan roller assemblies.

The seat pan may further includes a plurality of attachment points. In one embodiment, seat pan guides are attached to the attachment points of the seat pan. The seat pan guides may be slidably mounted onto wings formed onto the pair of opposed seat pan roller assemblies. Also, the rear seat pan guide may be adapted to slide downward and the front seat pan guide may be adapted to slide upward over the seat pan rollers as the seat pan articulates forward.

In one embodiment, the central axis of each of the seat pan rollers is positioned on the circumference of a circle defined by a first imaginary axis located above the passenger seat. Also, the central axis of each pair of spar tubes and the central axis of each of its associated seat pan rollers may be adapted to determine a plane whereby the pair of planes intersect to form a second imaginary axis located above the passenger seat, wherein the second imaginary axis is located below the first imaginary axis thereby putting the axis of rotation of the seat pan rollers about the spar tubes below the axis of rotation of the seat pan whereby the cross brace is in tension when the passenger seat is in use. The cross-sectional radii of the spar tubes may also be equal.

The seat back tray table attached to the back of the passenger seat may be movable between a first storage position and a second deployed position. In one embodiment, a lock mechanism is attached to the back of the passenger seat for retaining the seat back tray table in a secured position.

In one embodiment, the passenger seat further includes a display attached to the back of the passenger seat. The display may be adjoined by the back of the passenger seat.

A backrest may be mounted onto the passenger seat. In one embodiment, the backrest is reclinable. Also, the backrest may be adapted to recline up to about 10 inches.

The backrest may further include a headrest. In one embodiment, the headrest is adjustable to accommodate for the height of a passenger.

The passenger seat may further include an upholstered package. In addition, the passenger seat may further includes a trim package.

Accordingly, one aspect of the present inventions is to provide a seat system for a passenger aircraft, the seat system including (a) a passenger seat frame having at least one pair of generally parallel spar tubes laterally positioned across the passenger seat frame; and (b) an articulating seat pan assembly including (i) at least two pairs of opposed crescent-shaped seat pan roller assemblies attached to the spar tubes wherein each of the seat pan roller assemblies include a seat pan roller attached to its upper surface and (ii) a seat pan adapted to be mounted onto the pairs of opposed seat pan roller assemblies whereby the seat pan articulates along the seat pan rollers from back to front of the passenger seat frame.

Another aspect of the present inventions is to provide in a seat system for a passenger aircraft wherein the seat system includes a passenger seat frame having at least one pair of generally parallel spar tubes laterally positioned across the passenger seat frame, the improvement comprising an articulating seat pan assembly, the articulating seat pan assembly including (a) at least two pairs of opposed crescent-shaped seat pan roller assemblies attached to the spar tubes wherein each of the seat pan roller assemblies include a seat pan roller attached to its upper surface; (b) a seat pan adapted to be mounted onto the pairs of opposed seat pan roller assemblies whereby the seat pan articulates along the seat pan rollers from back to front of the passenger seat frame; and (c) a cross brace adapted to prevent the rotation of each pair of opposed seat pan roller assemblies about the radius of each of the spar tubes.

Still another aspect of the present inventions is to provide a seat system for a passenger aircraft, the seat system including (a) a passenger seat frame having at least one pair of generally parallel spar tubes laterally positioned across the passenger seat frame; (b) an articulating seat pan assembly including (i) at least two pairs of opposed crescent-shaped seat pan roller assemblies attached to the spar tubes wherein each of the seat pan roller assemblies include a seat pan roller attached to its upper surface; (ii) a seat pan adapted to be mounted onto the pairs of opposed seat pan roller assemblies whereby the seat pan articulates along the seat pan rollers from back to front of the passenger seat frame; and (iii) a cross brace adapted to prevent the rotation of each pair of opposed seat pan roller assemblies about the radius of each of the spar tubes; and (c) a seat back tray table attached to the back of the passenger seat.

These and other aspects of the present inventions will become apparent to those skilled in the art after a reading of the following description of embodiments when considered with the drawings.

BRIEF DESCRIPTION OF THE DRAWINGS

FIG. 13 is a side elevational view depicting one embodiment of a preferred configuration of the seat pan roller assembly.

DESCRIPTION OF THE EMBODIMENTS

Figure 1:
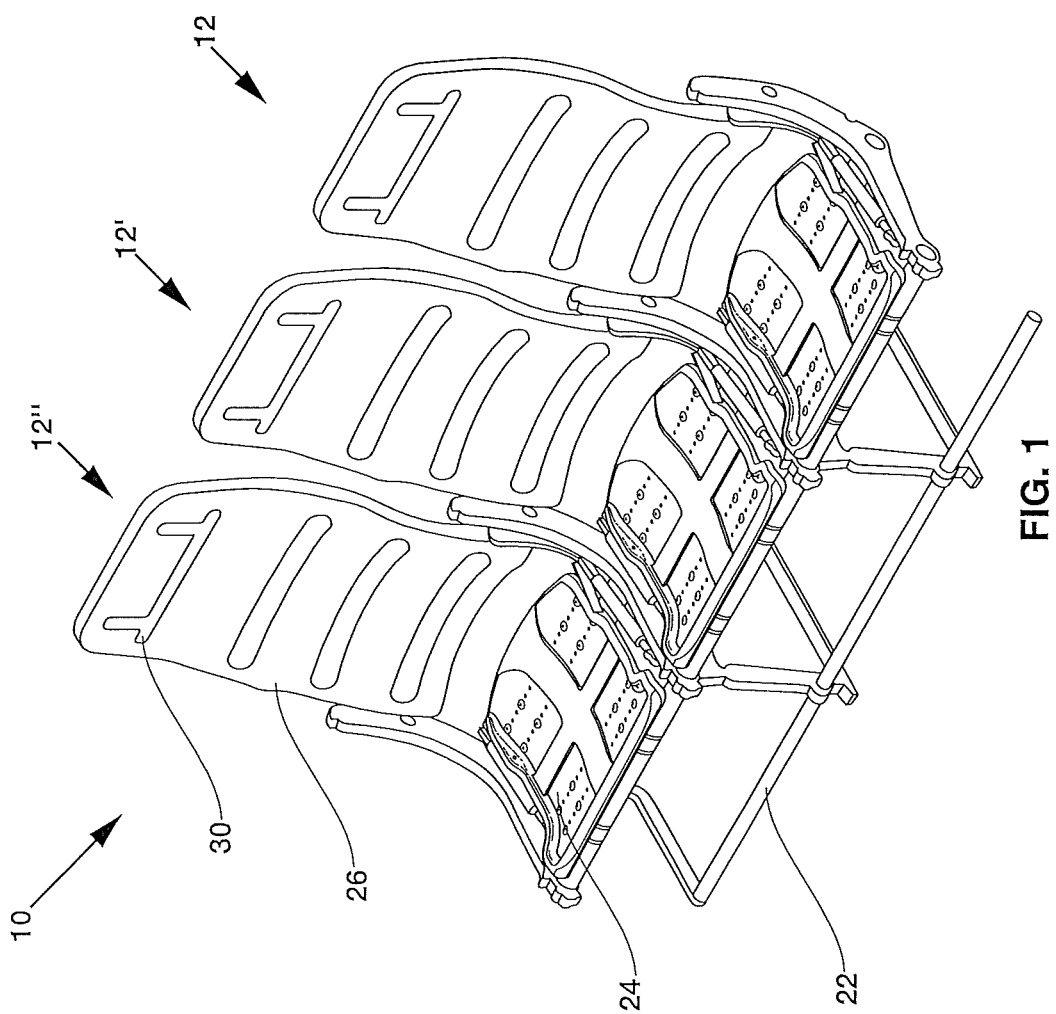
FIG. 1 is an overhead perspective view of one embodiment of a seat system constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the inventions and are not intended to limit the inventions thereto. As best seen in FIG. 1, a seat system, generally designated 10, is shown constructed according to the present inventions. The seat system 10 includes at least one passenger seat 12.

Each of the passenger seats 12 may include a base frame 22, a seat component 24 attached to a base frame and a backrest 26 attached to the base frame 22 adjoining the seat component 24. The backrest 26 may further include a headrest 30. In one embodiment headrest 30 is adjustable to accommodate the height of a passenger.

Figure 2:
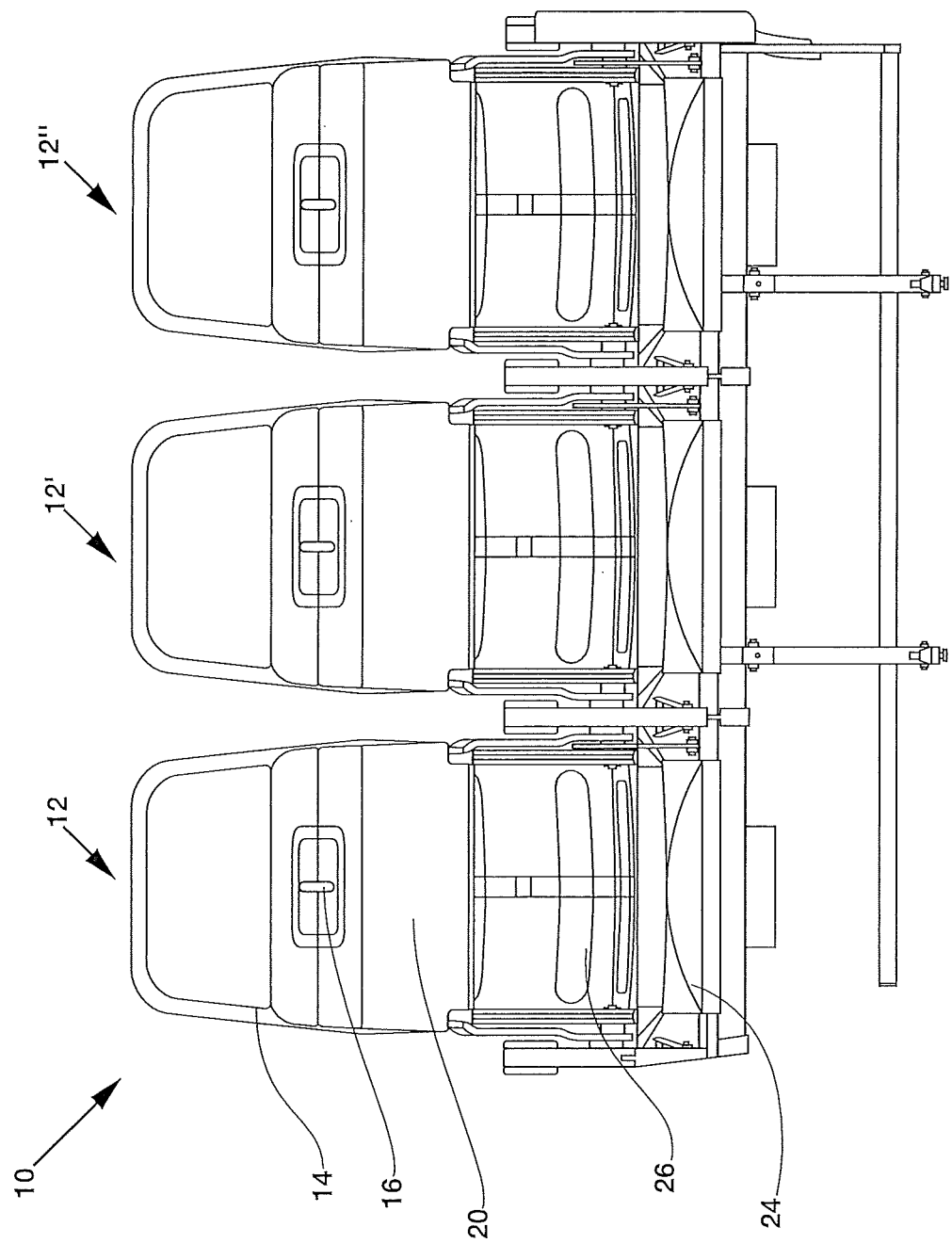
FIG. 2 is a rear elevational view of one embodiment of a seat system constructed according to the present inventions.

Turning to FIG. 2, there is shown a rear view of the seat system 10 constructed according to the present inventions. A seat back bezel 14 is attached to the back of the passenger seat 12. The seat back bezel 14 may adjoin a seat back tray table 20 attached to the back of passenger seat 12.

Figure 3:
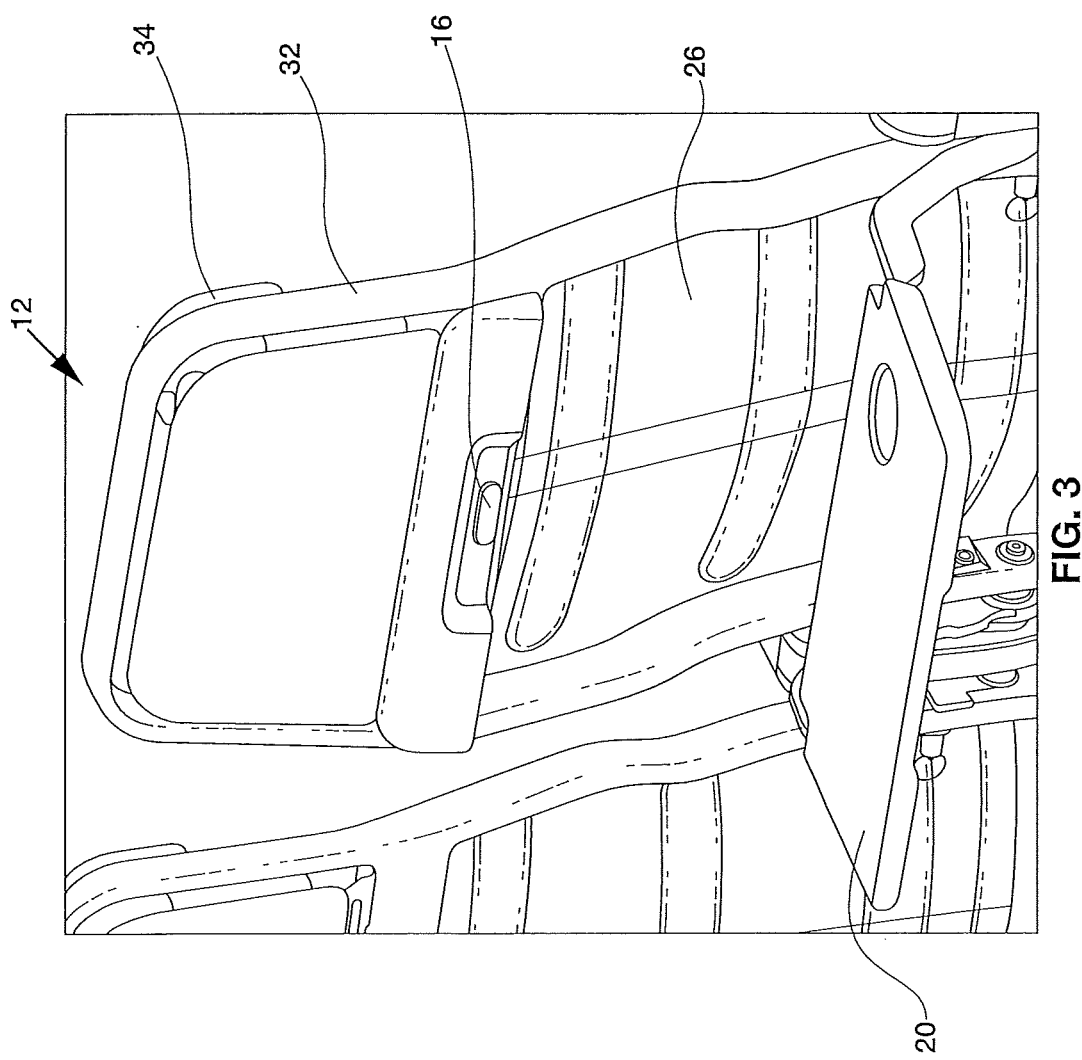
FIG. 3 is an enlarged back elevational view of FIG. 2 with the seat back tray deployed.

As best seen in FIG. 3, the seat back tray table 20 attached to the back of the passenger seat 12 is movable between its first storage position and a second deployed position. A lock mechanism 16 attached to the back of the seat back bezel 14 is adapted to retain the seat back tray table 20 in its secured position. The passenger seat 12 normally has a headrest closeout panel such as shown in FIGS. 2 and 3 but other embodiments may further include a display attached to the back of the passenger seat 12. The display may adjoin the seat back bezel 14. The passenger seat 12 may further include an upholstery package generally designated 32 and may also include a trim package generally designated 34.

Figure 4:
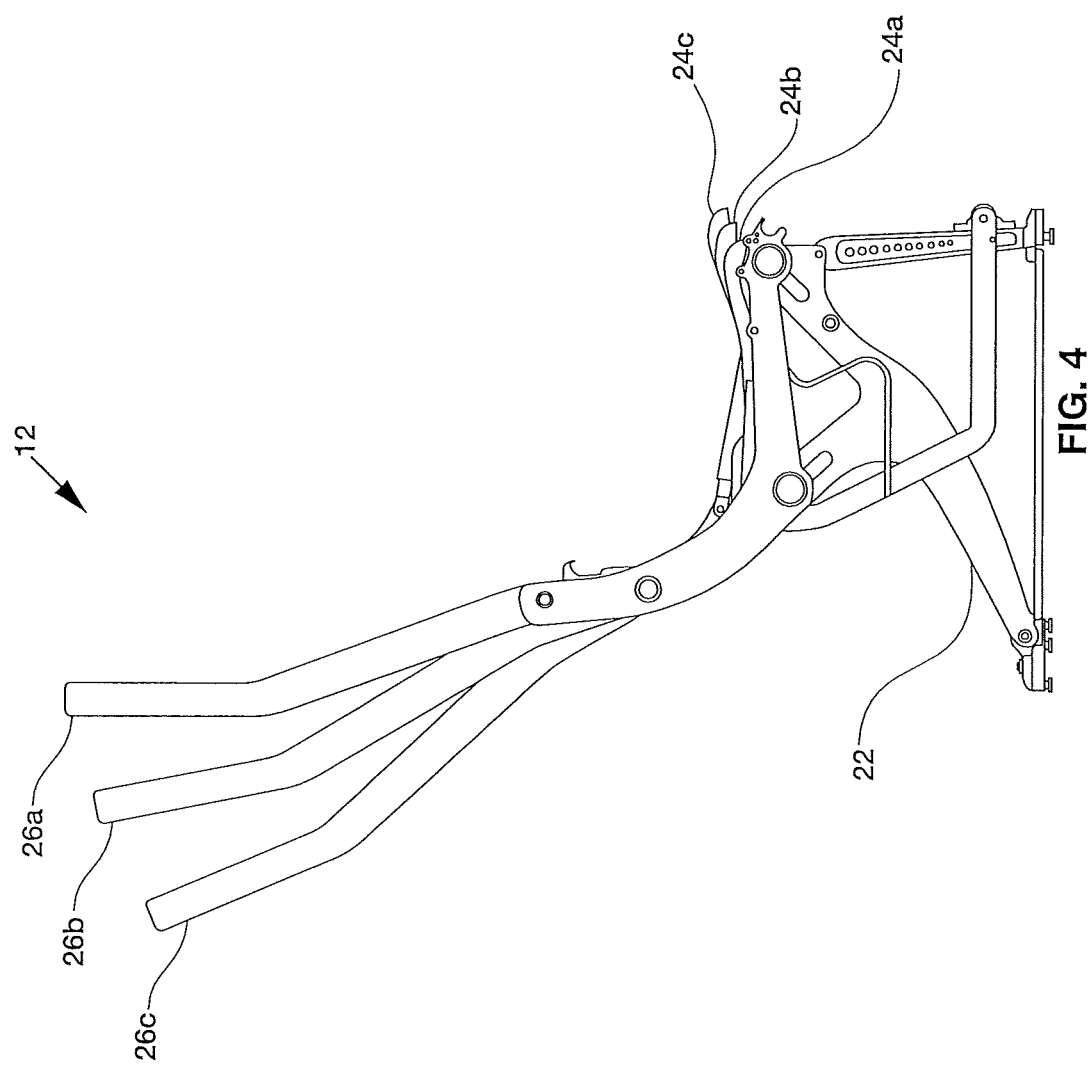
FIG. 4 is a side elevational view depicting various configurations of the backrest and seat pan.

FIG. 4 illustrates an example of how seat component 24 may articulate with respect to backrest 26 for a single passenger seat 12. As shown, the backrest is reclined at a default position 26a for passenger seat 12 while seat component remains at a default position 24a. Intermediate position 26b shows the backrest reclined 5 inches away from its default position 26a, with the seat component proportionally positioned forward at intermediate position 24b. As seat component 24 articulates forward, the rear portion of seat component tilts downward as the front portion tilts upward to improve comfort by preventing a passenger from feeling as if the seat pan is merely being pushed out. In the example shown, articulation of the seat pan is more comfortable for passengers due to the shift in body weight. The center of gravity changes as seat component 42 articulates forward, thereby allowing a passenger's weight to sink deeper into the seat as the passenger's legs are lifted up. Extended position 26c depicts the backrest reclined 10 inches away from its default position 26a, with the seat component proportionally positioned at extended position 24c.

Figure 5:
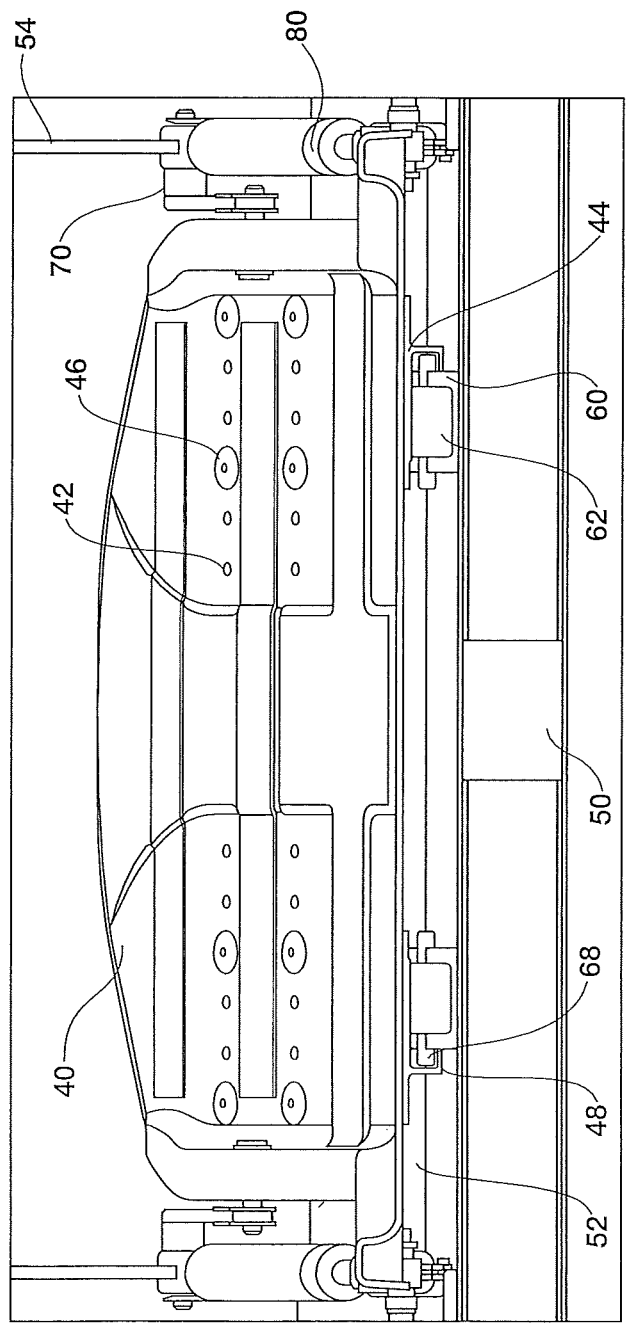
FIG. 5 is an enlarged front elevational view of one embodiment of an articulating seat pan assembly constructed according to the present inventions.

Turning to FIG. 5, an enlarged view of how seat component 24 is installed is shown. Spar tubes 50 and 52 are laterally positioned fore and aft on passenger seat frame 22, respectively. The articulating seat pan assembly is installed across spar tubes 50 and 52. Two pairs of opposed crescent-shaped seat pan roller assemblies 60 are each perpendicularly attached to both spar tubes 50 and 52, and remain parallel with respect to one another.

Each seat pan roller assembly 60 includes a seat pan roller 62 adapted to roll seat pan 40 across spar tubes 50 and 52. Seat pan 40 includes two pairs of seat pan roller guides 44 that are mounted onto the seat pan roller assemblies. Each seat pan roller guide 44 includes a lip 48 for wings 68 of the seat pan roller assemblies to be inserted.

Figure 6:
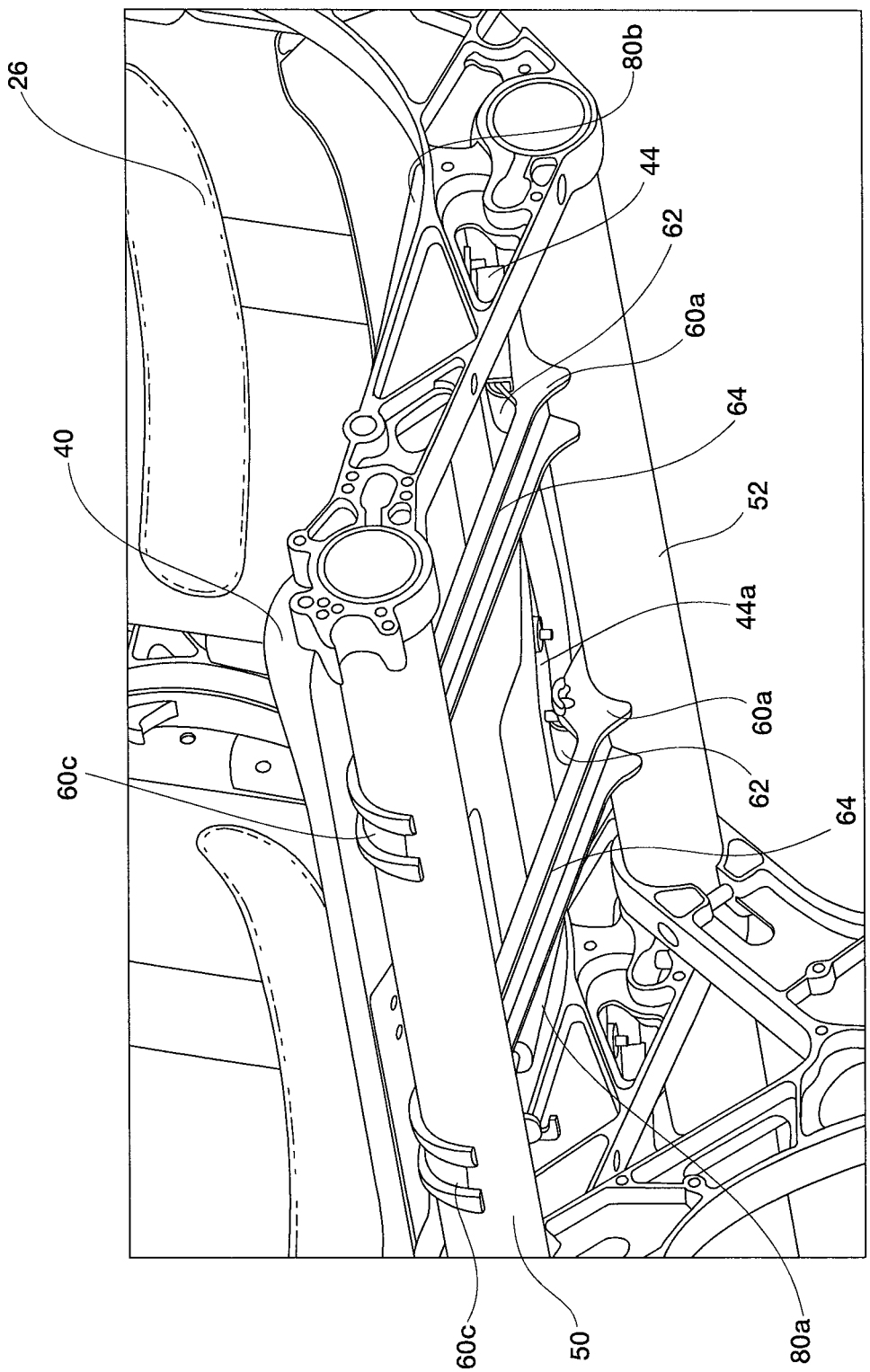
FIG. 6 is an enlarged perspective view of the articulating seat pan assembly in FIG. 5.

As can be seen in FIG. 6, each seat pan roller assembly 60 comprises a crescent-shaped piece that is shaped to fit over the curvature of spar tubes 50 and 52. In some embodiments, the opposing pair of seat pan roller assemblies may be adjoined by a cross brace 64. Cross brace 64 may be included to help prevent seat pan roller assemblies 60 from rotating along spar tubes 50 and 52. In certain embodiments, cross brace 64 may be injection molded as a single piece with a pair of seat pan roller assemblies, such as a carbon-infused injection molded plastic. The material chosen should be sufficiently strong for seat pan roller assembly 60 and cross brace 64 to remain sufficiently stiff when in use. Otherwise, cross brace 64 may dip and cause seat pan 40 to jam during operation.

Figure 7:
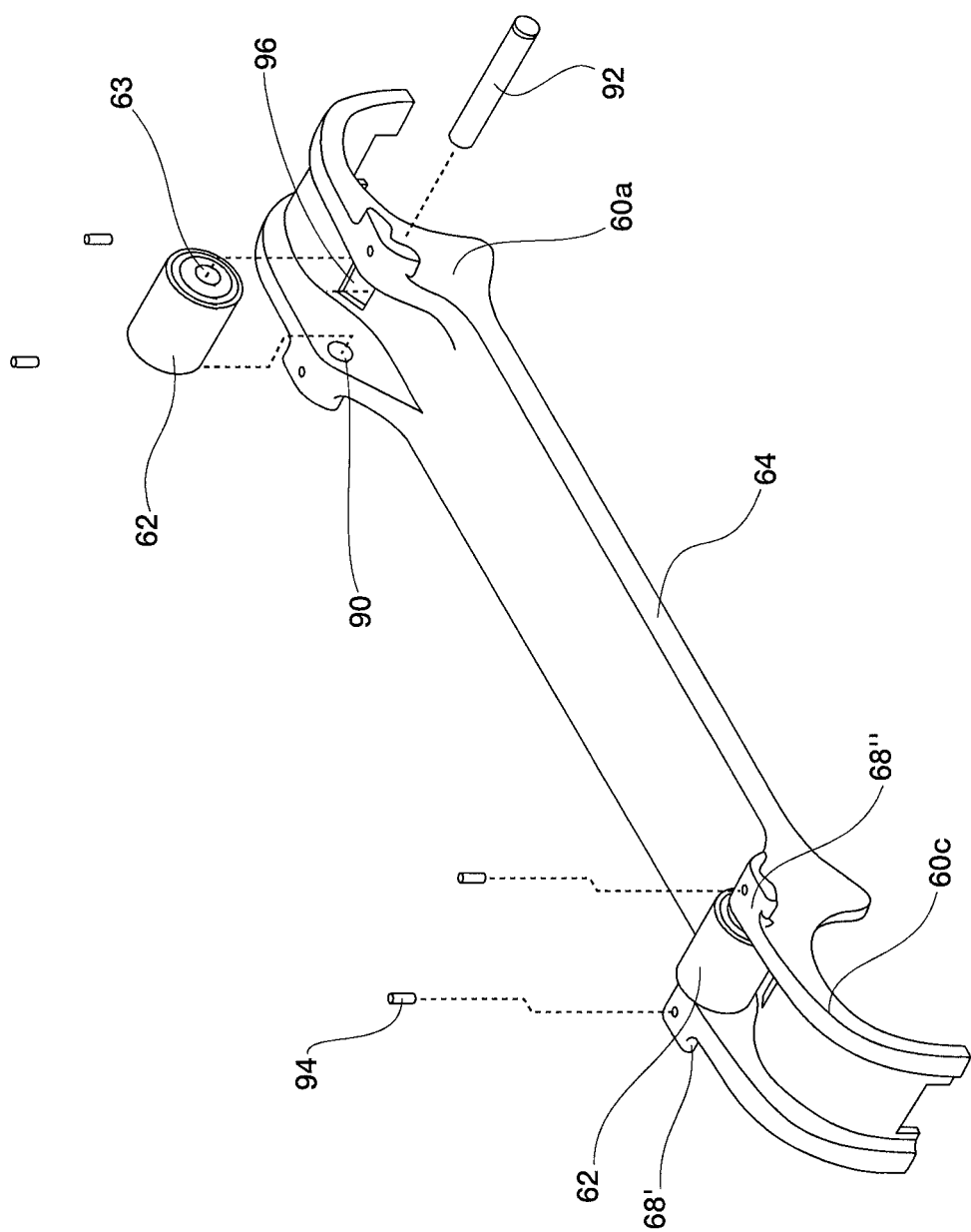
FIG. 7 is an enlarged exploded overhead perspective view of the seat pan roller assembly.

An enlarged exploded view of an embodiment wherein a pair of seat pan roller assemblies are adjoined by a cross brace is shown in FIG. 7. A first seat pan roller assembly 60*a* for attaching to the aft spar tube 52 is adjoined to a second seat pan roller assembly 60*c* by cross brace 64, wherein the second seat pan roller assembly 60*c* is adapted to attach to the fore spar tube 50. Each seat pan roller assembly 60 includes a seat pan roller 62 mounted between a pair of wings 68' and 68". Wings 68 are used for guiding the seat pan guide 44 while seat pan 40 articulates across the spar tubes. Moreover, wings 68 further secure seat pan 44 to passenger seat frame 22 and prevent seat pan 44 from being lifted up by a passenger when in use.

In the embodiment shown, seat pan roller assembly 60 includes holes 90 below wings 68 and seat pan roller 62 includes a hole 63 extending across wherein a shaft 92 is inserted through holes 63 and 90. Seat pan roller is then secured by fasteners 94. Each seat pan roller assembly 60 also includes an aperture 96 for threading a clamp through for securing to a spar tube. In the embodiment shown in FIG. 7, each seat pan roller assembly is symmetrical and therefore first seat pan roller assembly 60*a* may attach to fore spar tube 50 when second seat pan roller assembly 60*c* is attached to the aft spar tube 52.

Figure 8:
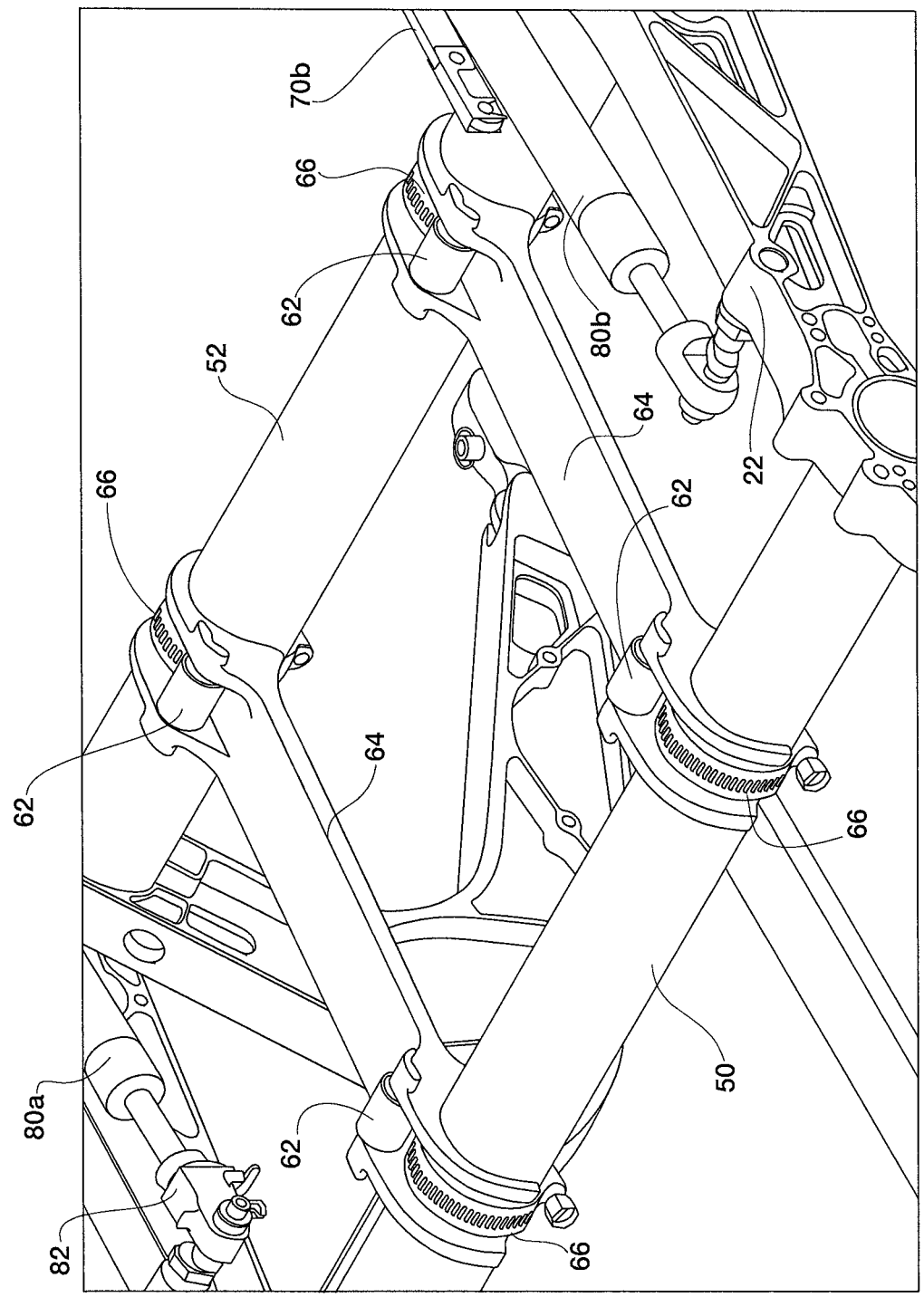
FIG. 8 is an enlarged overhead perspective view illustrating the seat pan roller assemblies attached to the fore and aft spar tubes.

FIG. 8 shows an embodiment of seat pan roller assemblies 60 installed onto spar tubes 50 and 52 without rivets. Each seat pan roller assembly 60 is placed atop a spar tube and secured by a clamp 66. In the embodiment shown, clamp 66 is a worm drive clamp. However, other clamps may be used in alternative embodiments. Other examples for securing a seat pan roller assembly to a spar tube include cable ties. By employing clamps, cable ties, or the like to install seat pan roller assembly 60, the amount of tools necessary for installation can be reduced compared to assemblies that require rivets for mounting. Nevertheless, in other embodiments, rivets may be used to secure seat pan roller assembly 60 onto the spar tubes.

Figure 9A:
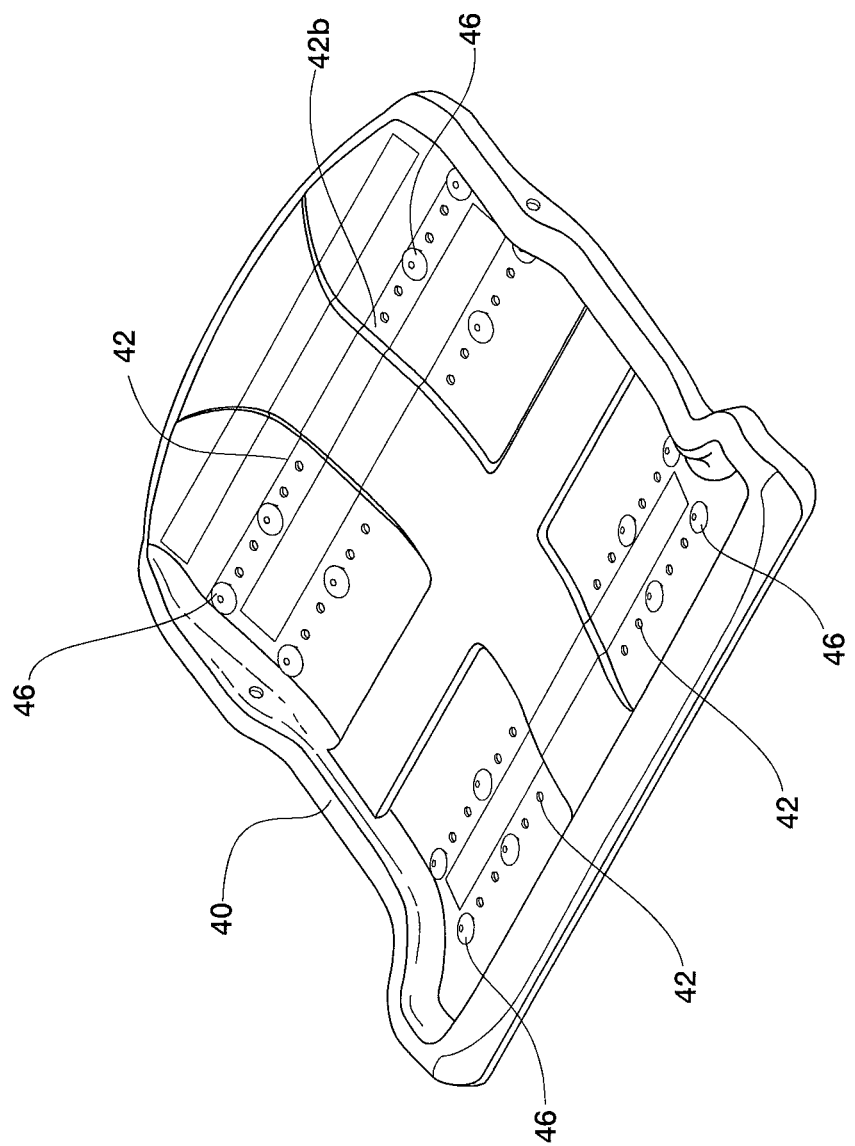
FIG. 9A is an overhead perspective view of one embodiment of a seat pan constructed according to the present inventions.
Figure 9B:
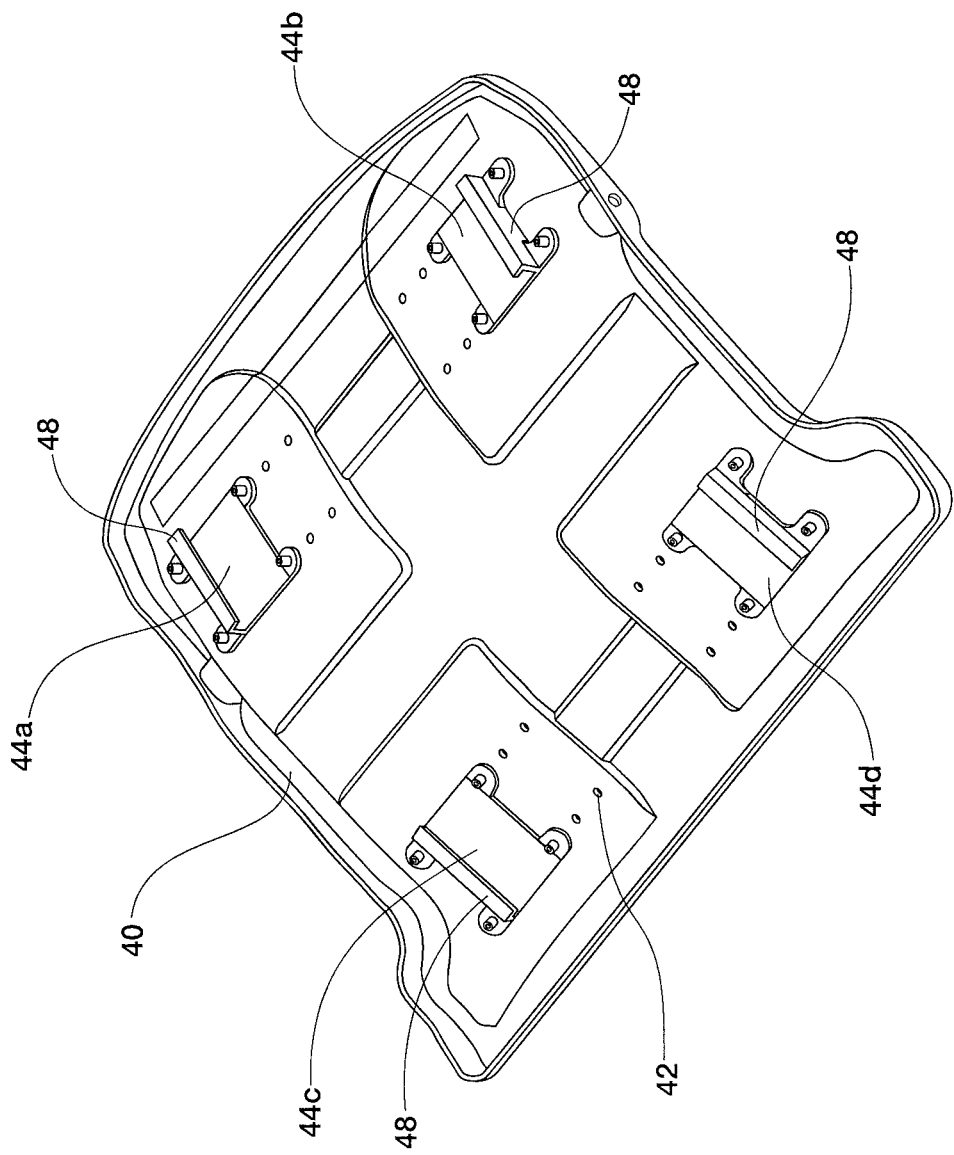
FIG. 9B is an enlarged bottom perspective view of the seat pan shown in FIG. 8B.

Turning to FIGS. 9A and 9B, one embodiment of a seat pan 40 is shown. FIG. 9A illustrates a top side of seat pan 40, wherein seat pan 44 includes various attachment points 42 adapted for seat guides 44 to attach onto seat pan 40. In the embodiment shown, seat pan 44 is divided into four quadrants wherein each quadrant contains twelve attachment points 42. By providing twelve attachments points within each quadrant, the embodiment shown enables thirty-six different installation arrangements for seat pan guides 44. FIG. 9B illustrates a bottom side of seat pan 40, wherein seat pan guides 44*a,b,c,d* are installed via fasteners 46 onto each quadrant. Other embodiments may vary in the number of attachment points 42 available on seat pan 40, and may not be necessarily grouped in quadrants.

Figure 10:
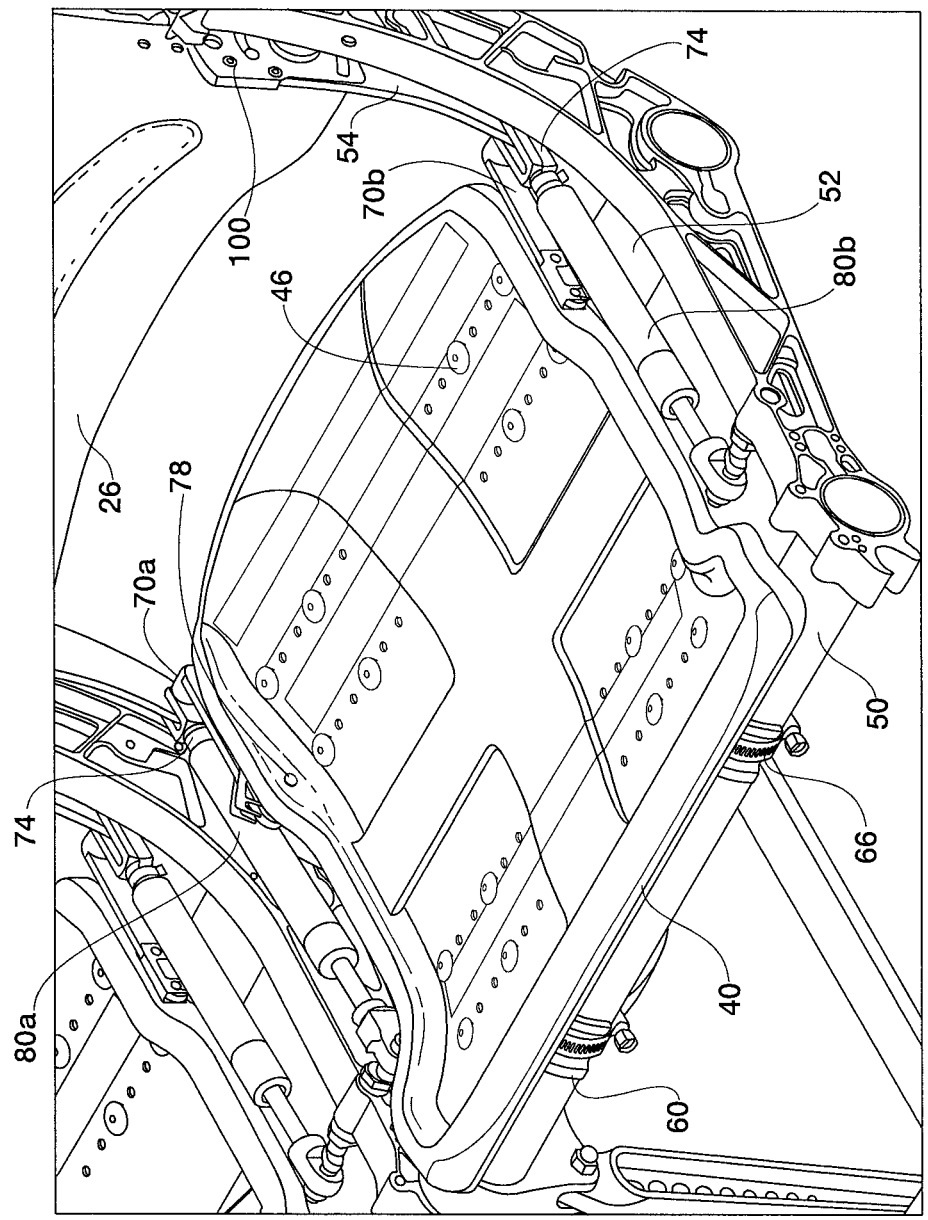
FIG. 10 is an enlarged overhead perspective view of a fully assembled articulating seat pan assembly.

As best seen in FIG. 10, seat pan 40 is secured to passenger seat frame 22 via a drive link 70 and articulates with respect to backrest 26 via a hinge 80. Drive link 70*a* secures a rear left side of seat pan 40 to hinge 80*a*, and drive link 70*b* secures a rear right side of seat pan 40 to hinge 80*b*. Drive link 70 connects to hinge 80 at end 72, and is secured via clamp 74 (see FIG. 11).

Figure 11:
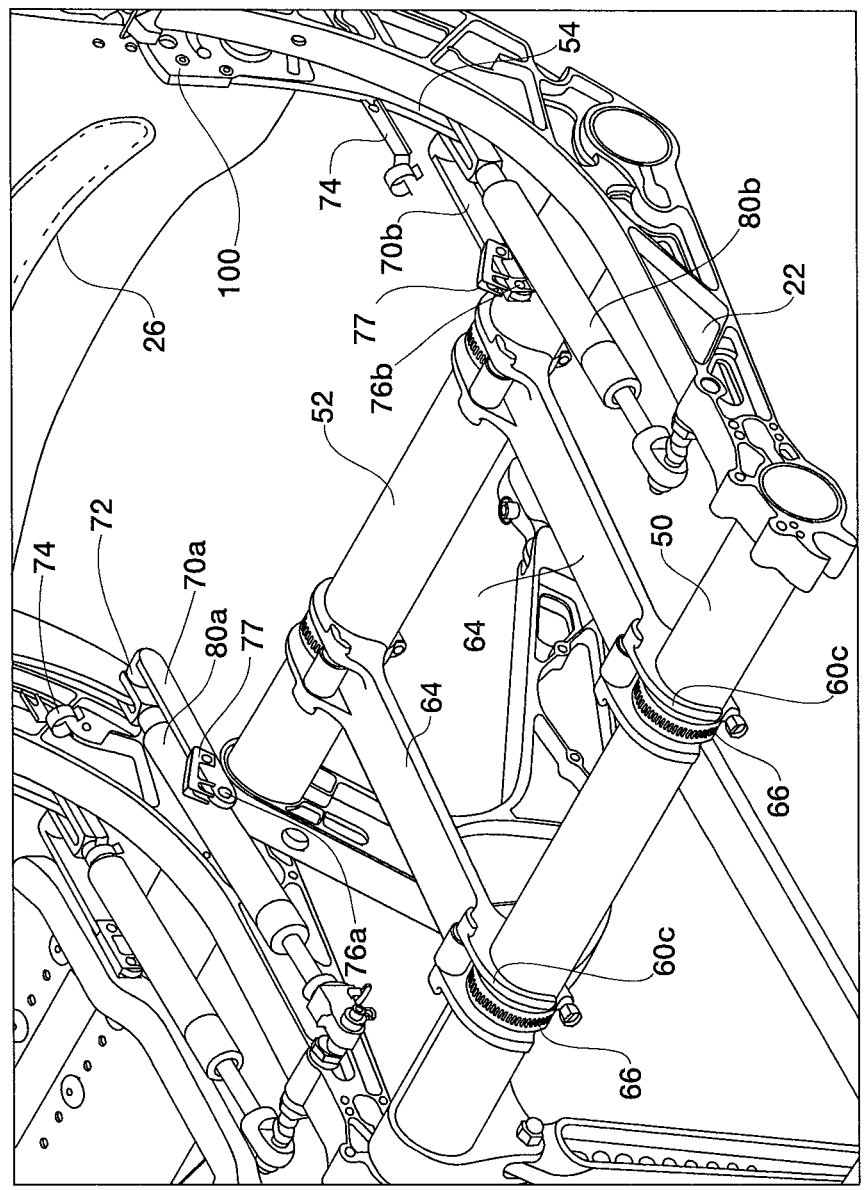
FIG. 11 is an enlarged overhead perspective view of a partially assembled articulating seat pan assembly.

FIGS. 10 and 11 depict one embodiment of how drive link 70 is installed onto seat pan 40. As seen in FIG. 11, drive link 70 includes a hole 76 adapted for inserting bolt 78 (see FIG. 10). Seat pan 40 includes two holes (not shown) that are aligned with holes 76*a* and 76*b*. Bolt 78 is inserted through hole 76 and a hole of the seat pan, and is secured by quick detach clip 77.

In one example, as shown in FIG. 10, hinge 80 may be a gas spring. As configured in FIG. 10, hinge 80 is connected to an articulating arm 54 at one end, and is connected to the passenger seat frame 22 at an opposing end. As backrest 26 reclines, articulating arm 54 translates the backrest's motion onto hinge 80. As hinge 80 moves in response to backrest 26 reclining, drive link 70 articulates seat pan 40 to a distance proportional to the distance that backrest 26 reclines. In other embodiments, hinge 80 may be a pivot point.

Figure 12:
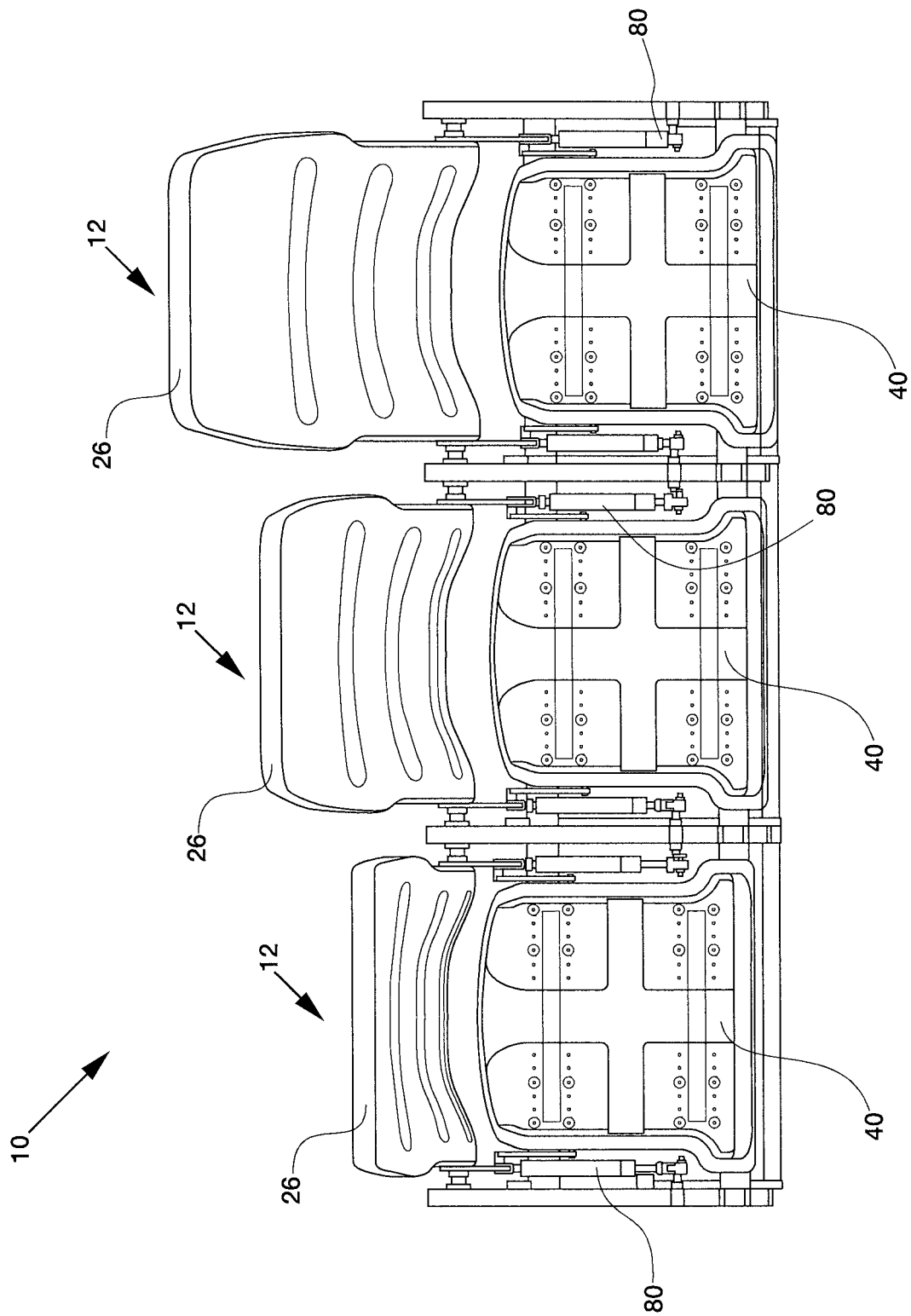
FIG. 12 is an overhead view of one embodiment of a seat system constructed according to the present inventions.

In operation, seat pan 40 articulates forward as backrest 26 reclines backward, and vice versa. As seen in the embodiment of FIG. 12, hinge 80 is a gas spring that compresses as backrest 26 reclines. As gas spring 80 compresses, drive link 70 proportionally translocates forward via end 72, and thereby articulates seat pan 40 forward in response.

FIG. 13 depicts a side view of passenger seat 12 with one example of a preferred configuration to prevent jamming of seat pan 40 when articulating across spar tubes 50, 52. In embodiments where the rear portion of seat pan 40 tilts downward as the front portion tilts upward when seat component 24 articulates forward, seat pan rollers 62 are preferably angled inward toward each other to prevent jamming of seat pan 40. For example, seat pan rollers 62 may be angled such that a central axis 114 for each seat back rollers 62 is positioned tangent to the circumference of a circle 112 defined by a first imaginary axis having a center 110 located above passenger seat 12. In some embodiments, the cross-sectional radii of spar tubes 50 and 52 are equal to prevent jamming of seat pan 40 during articulation.

In the embodiment shown, at least the majority of the load should preferably be displaced onto spar tubes 50,52 and the seat pan roller assemblies as opposed to cross brace 64. While cross brace 64 can accommodate a certain amount of load, cross brace 64 is primarily adapted for preventing seat pan roller assembly 60 from rotating out of position. In some configurations, placing the load onto cross brace 64 may cause it to dip and cause the seat pan to jam while articulating.

Another method for preventing seat pan 40 from jamming can be seen by the intersection of axes 116 in FIG. 13. As shown, the central axis of each pair of spar tubes 50, 52 and the central axis of each of its associated seat back rollers 62 (the combined axes shown as 116*a,c*) determine a plane whereby the pair of planes intersect to form a second imaginary axis located above passenger seat 12, wherein the point of intersection 120 is located below the center 110. In this particular configuration, the axis of rotation of seat back rollers 62 about spar tubes 50, 52 is positioned below the axis of rotation of the seat pan 40, whereby cross brace 64 is in tension when passenger seat 12 is in use.

Certain modifications and improvements will occur to those skilled in the art upon a reading of the foregoing description. By way of example, the articulating seat pan may be installed in vehicles other than aircrafts. Also, certain embodiments may integrate the seat pan roller assemblies as a single piece with the spar tube. It should be understood that all such modifications and improvements have been deleted herein for the sake of conciseness and readability but are properly within the scope of the following claims.

We claim:

1. A seat system for a passenger aircraft, said seat system comprising:
    (a) a passenger seat frame having at least one pair of generally parallel spar tubes laterally positioned across said passenger seat frame; and
    (b) an articulating seat pan assembly including
        (i) at least two pairs of opposed crescent-shaped seat pan roller assemblies attached to said spar tubes wherein each of said seat pan roller assemblies include a seat pan roller attached to its upper surface;
        (ii) a seat pan adapted to be mounted onto said pairs of opposed seat pan roller assemblies whereby said seat pan articulates along said seat pan rollers from back to front of said passenger seat frame; and
        (iii) a cross brace adapted to prevent the rotation of each pair of opposed seat pan roller assemblies about the radius of each of said spar tubes.

2. The seat system according to claim 1 further including a seat back tray table attached to the back of said passenger seat.

3. The seat system according to claim 2, wherein said seat back tray table attached to the back of said passenger seat is movable between a first storage position and a second deployed position.

4. The seat system according to claim 3 further including a lock mechanism attached to the back of said passenger seat for retaining said seat back tray table in a secured position.

5. The seat system according to claim 1 further including a display attached to the back of said passenger seat.

6. The seat system according to claim 5, wherein said display is adjoined by the back of said passenger seat.

7. The seat system according to claim 1 further including a backrest mounted onto said passenger seat.

8. The seat system according to claim 7, wherein said backrest is reclinable.

9. The seat system according to claim 8, wherein said backrest reclines up to about 10 inches.

10. The seat system according to claim 7, wherein said backrest further includes a headrest.

11. The seat system according to claim 10, wherein said headrest is adjustable to accommodate for the height of a passenger.

12. The seat system according to claim 1, wherein said passenger seat further includes an upholstered package.

13. The seat system according to claim 12, wherein said passenger seat further includes a trim package.

14. In a seat system for a passenger aircraft wherein the seat system includes a passenger seat frame having at least one pair of generally parallel spar tubes laterally positioned across said passenger seat frame, the improvement comprising an articulating seat pan assembly, said articulating seat pan assembly comprising:
    (a) at least two pairs of opposed crescent-shaped seat pan roller assemblies attached to said spar tubes wherein each of said seat pan roller assemblies include a seat pan roller attached to its upper surface;
    (b) a seat pan adapted to be mounted onto said pairs of opposed seat pan roller assemblies whereby said seat pan articulates along said seat pan rollers from back to front of said passenger seat frame; and
    (c) a cross brace adapted to prevent the rotation of each pair of opposed seat pan roller assemblies about the radius of each of said spar tubes.

15. The articulating seat pan assembly according to claim 14 further including a drive link attached to said seat pan and a hinge attached to a backrest and said drive link.

16. The articulating seat pan assembly according to claim 15, wherein said drive link articulates said seat pan to a distance proportional to the distance that said backrest reclines.

17. The articulating seat pan assembly according to claim 15, wherein said hinge is a gas spring.

18. The articulating seat pan assembly according to claim 17, wherein said gas spring compresses as said backrest reclines.

19. The articulating seat pan assembly according to claim 14, wherein said pair of opposed seat pan roller assemblies are mounted without tools.

20. The articulating seat pan assembly according to claim 19, wherein said pair of opposed seat pan roller assemblies are attached by a clamp.

21. The articulating seat pan assembly according to claim 20, wherein said clamp is a worm drive clamp.

22. The articulating seat pan assembly according to claim 14, wherein said cross brace is injection molded as a single piece with said pair of seat pan roller assemblies.

23. The articulating seat pan assembly according to claim 14, wherein said seat pan further includes a plurality of attachment points.

24. The articulating seat pan assembly according to claim 23 further including seat pan guides attached to the attachment points of said seat pan.

25. The articulating seat pan assembly according to claim 24, wherein said seat pan guides are slidably mounted onto wings formed onto said pair of opposed seat pan roller assemblies.

26. The articulating seat pan assembly according to claim 25, wherein a rear seat pan guide slides downward and a front seat pan guide slides upward over said seat pan rollers as said scat pan articulates forward.

27. The articulating seat pan assembly according to claim 14, wherein each seat an roller includes a central axis and a circle is defined by a first imaginary axis located above the passenger seat and the central axis of each of said seat pan rollers is positioned on the circumference of the circle defined by the first imaginary axis located above the passenger seat.

28. The articulating seat pan assembly according to claim 27, wherein each pair of spar tubes includes a central axis and the central axis of each pair of spar tubes and the central axis of each of its associated seat pan rollers determine a pair of planes whereby the pair of planes intersect to form a second imaginary axis located above the passenger seat, wherein said second imaginary axis is located below said first imaginary axis thereby putting the axis of rotation of the seat pan rollers about the spar tubes below the axis of rotation of the seat pan whereby the cross brace is in tension when the passenger seat is in use.

29. The articulating seat pan assembly according to claim 28, wherein the cross-sectional radii of each of said pair of spar tubes are equal.

30. A seat system for a passenger aircraft, said seat system comprising:
   (a) a passenger seat frame having at least one pair of generally parallel spar tubes laterally positioned across said passenger seat frame;
   (b) an articulating seat pan assembly including
      (i) at least two pairs of opposed crescent-shaped seat pan roller assemblies attached to said spar tubes wherein each of said seat pan roller assemblies include a seat pan roller attached to its upper surface;
      (ii) a seat pan adapted to be mounted onto said pairs of opposed seat pan roller assemblies whereby said seat pan articulates along said seat pan rollers from back to front of said passenger seat frame; and
      (iii) a cross brace adapted to prevent the rotation of each pair of opposed seat pan roller assemblies about the radius of each of said spar tubes; and
   (c) a seat back tray table attached to the back of said passenger seat.

31. The seat system according to claim 30, wherein said seat back tray table attached to the back of said passenger seat is movable between a first storage position and a second deployed position.

32. The seat system according to claim 31 further including a lock mechanism attached to the back of said passenger seat for retaining said seat back tray table in a secured position.

33. The seat system according to claim 30 further including a display attached to the back of said passenger seat.

34. The seat system according to claim 33, wherein said display is adjoined by the back of said passenger seat.

35. The seat system according to claim 30 further including a backrest mounted onto said passenger seat.

36. The seat system according to claim 35, wherein said backrest is reclinable.

37. The seat system according to claim 36, wherein said backrest reclines up to about 10 inches.

38. The seat system according to claim 35, wherein said backrest further includes a headrest.

39. The seat system according to claim 38, wherein said headrest is adjustable to accommodate for the height of a passenger.

40. The seat system according to claim 30, wherein said passenger seat further includes an upholstered package.

41. The seat system according to claim 40, wherein said passenger seat further includes a trim package.

42. The seat system according to claim 30 further including a drive link attached to said seat pan and a hinge attached to a backrest and said drive link.

43. The seat system according to claim 42, wherein said drive link articulates said seat pan to a distance proportional to the distance that said backrest reclines.

44. The seat system according to claim 42, wherein said hinge is a gas spring.

45. The seat system according to claim 44, wherein said gas spring compresses as said backrest reclines.

46. The seat system according to claim 30, wherein said pair of opposed seat pan roller assemblies are mounted without tools.

47. The seat system according to claim 46, wherein said pair of opposed seat pan roller assemblies are attached by a clamp.

48. The seat system according to claim 47, wherein said clamp is a worm drive clamp.

49. The seat system according to claim 30, wherein said cross brace is injection molded as a single piece with said pair of seat pan roller assemblies.

50. The seat system according to claim 30, wherein said seat pan further includes a plurality of attachment points.

51. The seat system according to claim 50 further including seat pan guides attached to the attachment points of said seat pan.

52. The seat system according to claim 51, wherein said seat pan guides are slidably mounted onto wings formed onto said pair of opposed seat pan roller assemblies.

53. The seat system according to claim 52, wherein a rear seat pan guide slides downward and a front seat pan guide slides upward over said seat pan rollers as said seat pan articulates forward.

54. The seat system according to claim 30, wherein each seat pan roller includes a central axis and a circle is defined by a first imaginary axis located above the passenger seat and the central axis of each of said seat pan rollers is positioned on the circumference of the circle defined by the first imaginary axis located above the passenger seat.

55. The seat system according to claim 54, wherein each pair of spar tubes includes a central axis and the central axis of each pair of spar tubes and the central axis of each of its associated seat pan rollers determine a pair of planes whereby the pair of planes intersect to form a second imaginary axis located above the passenger seat, wherein said second imaginary axis is located below said first imaginary axis thereby putting the axis of rotation of the seat pan rollers about the spar tubes below the axis of rotation of the seat pan whereby the cross brace is in tension when the passenger seat is in use.

56. The seat system according to claim 55, wherein the cross-sectional radii of each of said pair of spar tubes are equal.

* * * * *